United States Patent [19]

Hojo et al.

[11] Patent Number: 4,879,918

[45] Date of Patent: Nov. 14, 1989

[54] GYRO COMPASS

[75] Inventors: Takeshi Hojo; Kanshi Yamamoto; Shinichi Kawada, all of Kuroiso; Kazushige Murabayashi, Kawachi; Mamoru Akimoto, Kuroiso; Michio Fukano, Ohtawara, all of Japan

[73] Assignee: Tokyo Keiki Co., Ltd., Tokyo, Japan

[21] Appl. No.: 263,408

[22] Filed: Oct. 27, 1988

[30] Foreign Application Priority Data

Oct. 28, 1987 [JP] Japan ................................ 62-272076
Oct. 28, 1987 [JP] Japan ................................ 62-272077

[51] Int. Cl.⁴ .......................................... G01C 19/38
[52] U.S. Cl. ..................................... 74/5.47; 33/327; 74/5.9
[58] Field of Search ............... 74/5.9, 5.47; 33/327 A, 33/326

[56] References Cited

U.S. PATENT DOCUMENTS 3,321,841  5/1967  Kawada ............................. 33/327
3,596,366  8/1971  Kawada ............................. 33/327
3,855,711  12/1974 Kawada et al. ..................... 33/327
3,935,644  2/1976  Kawada et al. ............... 74/5.6 D X
3,938,256  2/1976  Crocker .......................... 74/5.4 X Primary Examiner—Rodney H. Bonck
Attorney, Agent, or Firm—Hill, Van Santen, Steadman & Simpson

[57] ABSTRACT

A gyro compass having a gyro case incorporating a gyro of which the spin axis is substantially horizontal, a vertical ring disposed around the outer periphery of the gyro case and for rotatably supporting the gyro case around a vertical axis, a follow-up pickup for detecting an angular displacement between the gyro case and the vertical ring around the vertical axis, an accelerometer having an input axis parallel to the spin axis, a vertical torquer mounted on the vertical ring for applying a torque of magnitude proportional to an input signal to the gyro case around the vertical axis, and a control apparatus for receiving an output signal of the accelerometer and for supplying its output to the vertical torquer, in which during a predetermined time after the gyro compass is started to operate, the output signal from the accelerometer is differentiated to produce a differentiation signal which is then supplied to the vertical torquer to reduce a settling time of the north-seeking action.

4 Claims, 5 Drawing Sheets

GYRO COMPASS

BACKGROUND OF THE INVENTION

1. Field of the Invention

The present invention relates generally to gyro compass for ships or the like and more particularly to a fast settle apparatus thereof.

2. Description of the Prior Art

An example of a gyro compass to which a fast settle apparatus of the present invention is applied will be described with reference to FIG. 1. FIG. 1 shows such a gyro compass that is disclosed in Japanese Pat. No. 428317.

In FIG. 1, reference letter A generally shows a gyro compass which includes a gyro case 1. The gyro case 1 incorporates therein a gyro rotor which is rotated by an induction motor at high speed and at a constant rotational speed though not shown. The rotation vector of the gyro rotor is oriented to the south (in the clockwise direction as viewed from the north side N). The gyro case 1 has a pair of vertical shafts 2, 2' projected therefrom at its top and bottom. These vertical shafts 2, 2' are respectively engaged with inner rings of ball bearings 4, 4' secured to corresponding positions of a vertical ring 3 which is provided outside the gyro case 1. The lower end of a suspension wire 5 is fixed to the upper vertical shaft 2 and the upper end of the suspension wire 5 is secure to the vertical ring 3 via a suspension wire attaching base 5'.

With the above-mentioned structure, the weight of the gyro case 1 does not become any thrust load for the ball bearings 4, 4' of the vertical shafts 2, 2' but it is thoroughly received by the suspension wire 5. Thus, the friction torque of the ball bearings 4, 4' can be reduced considerably. A pair of liquid ballistics 6 are attached to the vertical ring 3 at its east and west to give the gyro a north-seeking torque.

The pair of liquid ballistics 6 will be described more in detail with reference to FIG. 2. As shown in FIG. 2, each of the liquid ballistics 6 is a kind of communicated tube shape which comprises liquid reservoirs 6-1', 6-1 located on the south and north of gyro, liquid 6-2 of high specific gravity filling almost half of the liquid reservoirs 6-1', 6-1, an air tube 6-3 which communicates the south and north liquid reservoirs 6-1, 6-1' in the upper sides and a liquid tube 6-4 which communicates the same in the lower sides.

Referring back to FIG. 1, the gyro case 1 has a damping weight 7 secured to its west side portion to damp or suppress the north-seeking movement of the gyro. Also, the gyro case 1 has mounted on its east side portion a primary coil 8-1 of a differential transformer to detect a relative displacement angle between the gyro case 1 and the vertical ring 3 about the vertical shafts 2, 2'. The vertical ring 3 has a secondary coil 8-2 of the differential transformer mounted thereon at its positive opposing to the primary coil 8-1. The primary and secondary coils 8-1 and 8-2 constitute a follow-up pickup 8. Further, the vertical ring 3 has a pair of horizontal shafts 9, 9' projected therefrom outwardly at its east and west side positions perpendicular to both the vertical shafts 2, 2' and the gyro spin axis. These horizontal shafts 9, 9' are respectively engaged with inner rings of ball bearings 11, 11' secured to the corresponding positions of a horizontal ring 10 located outside the vertical ring 3. Also, the horizontal ring 10 has a pair of gimbal shafts 12, 12' mounted thereon at its position perpendicular to the horizontal shafts 9, 9' within the horizontal plane. These gimbal shafts 12, 12' are respectively engaged with a pair of gimbal shaft ball bearings 14, 14' secured to a follow-up ring 13 located outside the horizontal ring 10.

The follow-up ring 13 has follow-up shafts 15, 15' mounted thereon at its upper and lower portions as shown in FIG. 1. These follow-up shafts 15, 15' are engaged with follow-up ring bearings 17, 17' which are secured to a binnacle 16 at its corresponding positions, respectively.

The upper follow-up shaft 15 has a compass card 18 mounted thereon at its upper end. The binnacle 16 has a lubber line 18B fixed thereto at its position corresponding the ship's heading. Accordingly, a ship's azimuth angle is read out in the collaboration o the compass card 18 and the lubber line 18B. The binnacle 16 has an azimuth servo motor 19 mounted on the lower portion thereof. The azimuth servo motor 19 has a rotating shaft 19A which is coupled through an azimuth pinion 20 to an azimuth gear 21 located under the follow-up ring 13. The binnacle 16 has an azimuth transmitter 22 mounted on the lower portion thereof, and a rotating shaft 22A of the azimuth transmitter 22 is meshed with the azimuth gear 21 via a gear system (not shown) to transmit an azimuth signal in the form of an electrical signal to the outside.

The parts within the horizontal ring 10, i.e., parts including the horizontal ring 10, the vertical ring 3, the gyro case 1 and so on constitute a so-called sensitive element. The sensitive element forms a physical pendulum, whose lower portion is heavier than its upper portion, around the gimbal shafts 12, 12' thereby to keep the horizontal shafts 9, 9' within the horizontal plane at all times regardless of the inclination of ship's body or hull.

When there is a difference between the azimuth of the gyro case 1 and the azimuth of the vertical ring 3, the follow-up pickup 8 provided therebetween detects the difference and converts the detected difference into an electrical signal. This electrical signal is amplified by a servo amplifier 23 located outside the gyro compass 1 and applied to the azimuth servo motor 19 (azimuth servo system). The rotation of the azimuth servo motor 19 caused thereby is transmitted through its rotating shaft 19A, the gear series and the azimuth gear 21 to the follow-up ring 13 and is further transmitted through the horizontal ring 10 and the horizontal shafts 9, 9' and so on to the vertical ring 3, thus keeping the vertical ring 3 and the gyro case 1 have no azimuth displacement therebetween at all times.

Owing to the action of the azimuth servo system, the horizontal shafts 9, 9' and the gyro spin axis are always made in a perpendicular relationship and no twisting torque of the suspension wire 5 is applied to the gyro at all Specifically, owing to the actions of the three axes, 9' and the gimbal shafts 12, 12' of the servo system, the gyro case 1 is perfectly isolated from the angular motion of ship's hull, thus a gyroscope being constructed.

The above-mentioned liquid ballistic 6 gives the gyroscope the north-seeking torque, i.e., a function as a compass.

The principle of the liquid ballistic 6 will be described next with reference to FIG. 2. FIG. 2 illustrates a case where the north-seeking end of the gyro is lifted up relative to the horizontal plane HL by an angle $\theta$.

In this embodiment, let it be assumed that the ship is brought to stop. THen, the surface L1 of the liquid 6-2 is perpendicular to the direction of acceleration of gravity g. Accordingly, as compared with a case where there is no inclination in the gyro, the liquid shown by the hatched area in FIG. 2 is decreased in the liquid reservoir 6-1' on the north side while increased in the liquid reservoir 6-1 on the south side. Now, r1 assumes the distance from each of the horizontal shafts 9, 9' to the center of each of the liquid reservoirs 6-1, 6-1'; S assumes the sectional area of each of the liquid reservoirs 6-1, 6-1' and $\rho$ assumes the specific gravity of the liquid 6-2. Then, the weight of the liquid in the inclined portion is expressed as $$S \times r1 \sin\theta \times \rho \times g$$

The above umbalance of weight occurs in both the liquid reservoirs 6-1, 6-1' on the south and north sides and the moment arm from each of the horizontal shafts 9, 9' is r1 so that a torque $T_H$ that is generated by the liquid ballistic 6 around the horizontal shafts 9, 9' when the north-seeking end of the gyro is inclined by the angle $\theta$ is approximately expressed as $$T_H = 2S\ r1^2\ g\rho\theta$$

In this case, $$2S\ r1^2 g\rho = K$$

is assumed where K is called the ballistic constant. In other words, the liquid ballistic 6 applies the torque proportional to the inclination of the gyro spin axis relative to the horizontal plane to the gyro around its horizontal shafts 9, 9' so that the gyro is given the north-seeking torque, thus being made as a gyro compass.

On the other hand, the damping weight 7 is mounted on the gyro case 1 with a distance r2 (in the direction perpendicular to the sheet of drawing) from the vertical shafts 2, 2' within a plane including the vertical shafts 2, 2' and which is also perpendicular to the gyro spin axis as shown in FIG. 3. FIG. 3 illustrates, as viewing on the west side, the gyro case 1 which is placed in such a condition that the north-seeking end of gyro is inclined upward (or lifted up) relative to the horizontal plane HL by the angle $\theta$. As FIG. 3 shows, since gravitational acceleration g acts on the damping weight 7 with mass m, the force of m×g is applied to the damping weight 7 in the vertical direction. Then, let it be considered that this force n×g is analyzed into a component m g cos $\theta$ parallel to the horizontal shafts 2, 2' and a component m g sin $\theta$ parallel to the spin axis. Of these components m g cos $\theta$ and m g sin $\theta$, the component m g cos $\theta$ parallel to the vertical shafts 2, 2' acts only as the load for the ball bearings 4, 4' of the vertical shafts 2, 2'. Whereas, the component m g sin $\theta$ parallel to the spin axis is multiplied with the distance r2 from the vertical shafts 2, 2' and acts on the gyro as the torque around the vertical shafts 2, 2'. T$\phi$ assumes this torque. Then, the torque T$\phi$ is approximately expressed by the following equation $$T\phi = \mu \cdot \theta$$

where $\mu$ is equal to m g r2.

In other words, the damping weight 7 is adapted to apply the torque proportional to the inclination of the gyro spin axis relative to the horizontal plane to the gyro around its vertical shafts 2, 2'. The north-seeking movement of the compass can be damped by the damping weight 7.

FIG. 4 is a block diagram used to explain the principle of the north-seeking operation of the above-mentioned gyro compass shown in FIG. 1. Particularly in the block diagram of FIG. 4, azimuth error $\phi$ and inclination angle $\theta$ of the north-seeking end of the gyro spin axis from the true north are taken as variable and the north-seeking movement (or the precession) of the gyro relative to initial errors $\phi_0$, $\theta_0$ thereof is expressed by Laplace operator and transfer function. In FIG. 4, g represents the gravitational acceleration, R the radius of the earth, $\Omega$ the angular velocity of earth's rotation, H the angular momentum of the gyro, $\lambda$ the latitude at that point, K the north-seeking constant (ballistic constant), $\mu$ the damping constant and S the Laplace operator, respectively.

If now there exists the azimuth error $\phi$, this azimuth error $\phi$ is multiplied with a horizontal component $\Omega$ cos $\lambda$ (100) of the angular velocity $\Omega$ of earth's rotation to produce an angular velocity input. This angular velocity input acts on an element 101 around the horizontal axis of the gyro thereby to produce together with the initial inclination angle $\theta_0$ the inclination angle $\theta$ of gyro. By the inclination angle $\theta$ of the spin axis, the vertical ring 3 is inclined similarly and the liquid ballistic 6 mounted on the vertical ring 3 is also inclined so that the liquid 6-2 is moved to the inclined side liquid reservoir 6-1, thus producing a torque K$\theta$ around the horizontal axis of the gyro. This torque K$\theta$ is divided by the gyro angular momentum H and is then added with the vertical component $\Omega$ sin $\lambda$ of earth rotation angular velocity to produce an angular velocity input. This angular velocity input acts on an element 102 provided around the vertical axis of the gyro. This angular velocity input is added with the initial azimuth error $\phi_0$ to produce the azimuth error $\phi$, by which the loop is closed. The loop is the north-seeking loop of the gyro compass. the solution of this loop becomes the oscillating solution because the loop contains two poles represented by 1/S. The torque $\mu\theta$, which results from multiplying the gyro inclination angle $\theta$ with the damping constant $\mu$, is divided by the angular momentum H to provide an angular velocity input. This angular velocity input is negatively fed back to the horizontal axis element 101 of the gyro so as to reduce the above-mentioned inclination angle $\theta$ so that the north-seeking movement of the north-seeking loop is damped. This latter loop is the damping loop.

The marine gyro compass is generally designed to make its north-seeking movement period about 90 minutes (condition of Schuler tuning) in order to avoid acceleration error from being produced in the gyro compass due to acceleration in the horizontal direction caused by increase and/or decrease of ship's speed, ship's turning and so one. As a result, it takes a lot of time (this time is referred to as a settling time) until the gyro compass becomes settled to the true north after having been actuated.

In most cases, the above-mentioned settling time is negligible for the standard ships in navigation. This long settling time becomes a problem that should be solved by the ship for special service.

OBJECTS AND SUMMARY OF THE INVENTION

Accordingly, it is an object of the present invention to provide an improved gyro compass.

It is another of the present invention to provide a gyro compass having a fast settle apparatus which can reduce the settling time of the gyro compass.

It is a further object of the present invention to provide a gyro compass which can be simplified in arrangement and which can be produced at low cost.

According to an aspect of the present invention, there is provided a gyro compass comprising:

(a) a gyro case incorporating a gyro of which the spin axis is substantially horizontal;

(b) a vertical ring disposed around the outer periphery of said gyro case and for rotatably supporting said gyro case around a vertical axis;

(c) a follow-up pickup for detecting an angular displacement between said gyro case and said vertical ring around said vertical axis;

(d) an accelerometer having an input axis parallel to said spin axis;

(e) a vertical torquer mounted on said vertical ring for applying a torque of magnitude proportional to an input signal to said gyro case around said vertical axis; and (f) a control apparatus for receiving an output signal of said accelerometer and for supplying its output to said vertical torquer, in which during a predetermined time after the gyro compass is started to operate, the output signal from said accelerometer is differentiated to produce a differentiation signal which is then supplied to said vertical torquer to reduce a settling time of the north-seeking action.

The above, and other objects, features, and advantages of the present invention will become apparent from the following detailed description of the preferred embodiments, to be taken in conjunction with the accompanying drawings, in which like reference numerals identify like elements and parts.

DETAILED DESCRIPTION OF THE PREFERRED EMBODIMENTS

Figure 1:
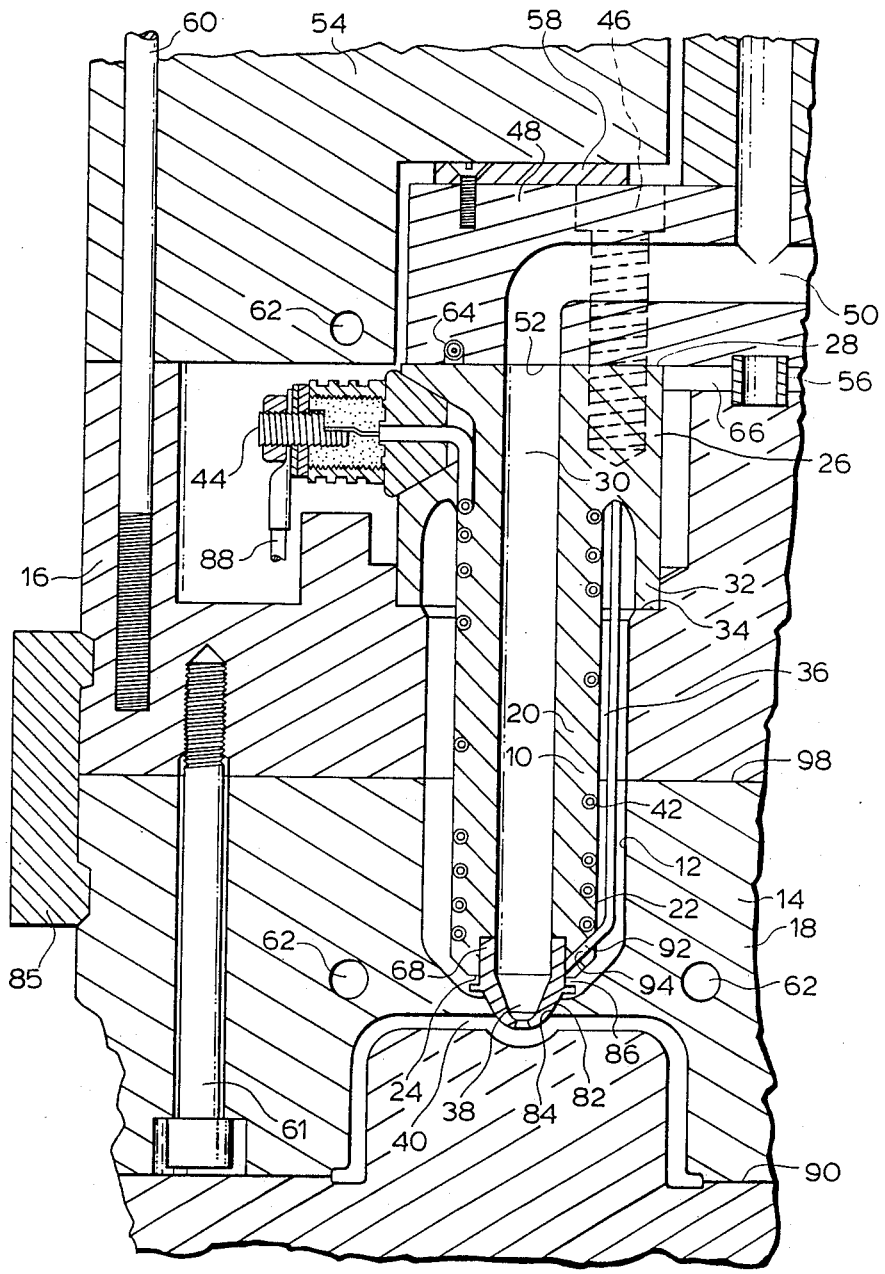
FIG. 1 is a perspective view of an example of a conventional gyro compass.
Figure 2:
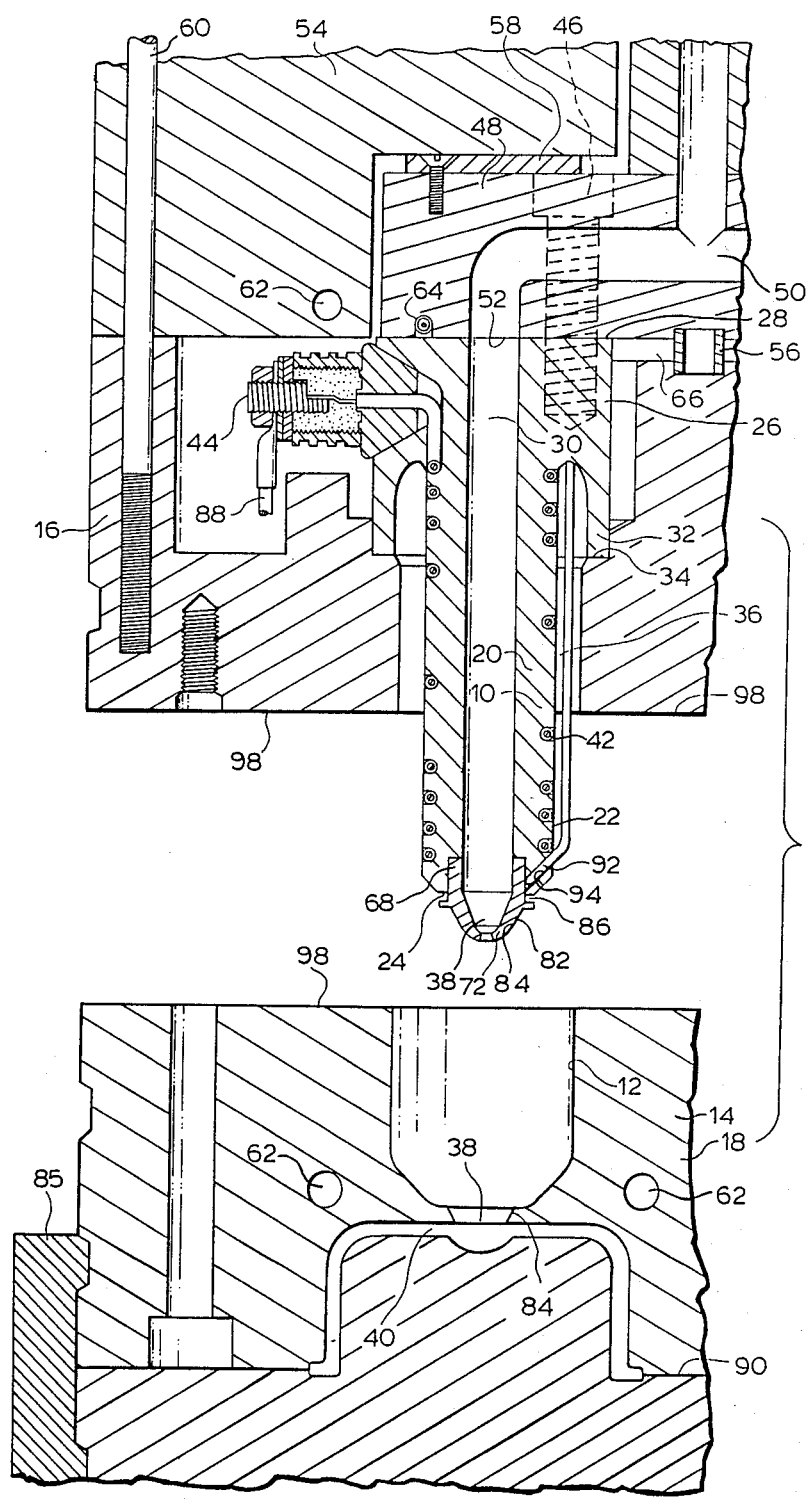
FIG. 2 is a schematic illustration of a liquid ballistic used in the conventional gyro compass shown in FIG. 1.
Figure 3:
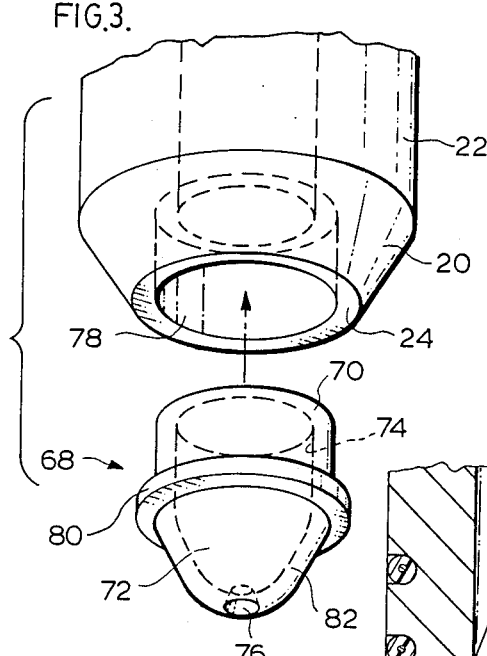
FIG. 3 is a schematic illustration used to explain the principle of a damping weight used in the gyro compass shown in FIG. 1.
Figure 5:
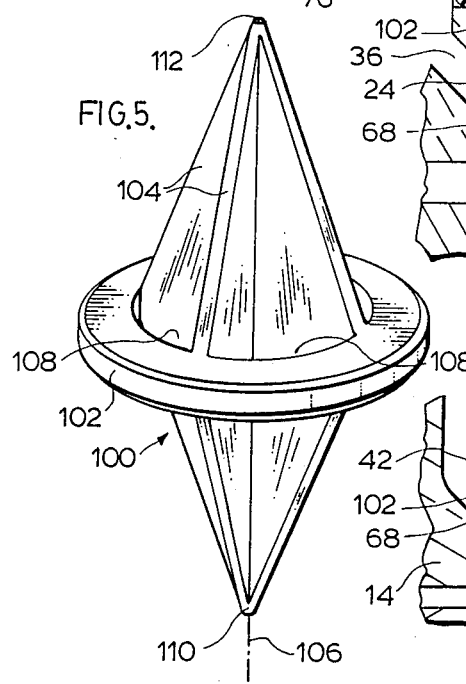
FIG. 5 is a perspective view of an embodiment of a gyro compass according to the present invention.

An embodiment of a gyro compass having a novel fast settle apparatus according to the present invention will hereinafter be described in detail with reference to a perspective view forming FIG. 5. In FIG. 5, like parts corresponding to those of FIG. 1 are marked with the same reference and therefore need not be described in detail.

The embodiment of the gyro compass shown in FIG. 5 is different from the example of the conventional one shown in FIG. 1 as follows. In the embodiment of the present invention shown in FIG. 5, an accelerometer 50 having an input axis parallel to the spin axis of the gyro rotor (not shown) is attached to the vertical ring 3; a vertical torquer 51 which applies a torque proportional to the input current to the gyro case 1 around its vertical shafts 2, 2' is attached to the vertical ring 3 and the gyro case 1; and a control apparatus 52 is provided which receives an output signal 8A of the follow-up pickup 8 and an output signal 50A (proportional to the inclination angle of the gyro spin axis relative to the horizontal plane) of the accelerometer 50 and supplies an output signal 51A to the above-mentioned vertical torquer 51.

Figure 6:
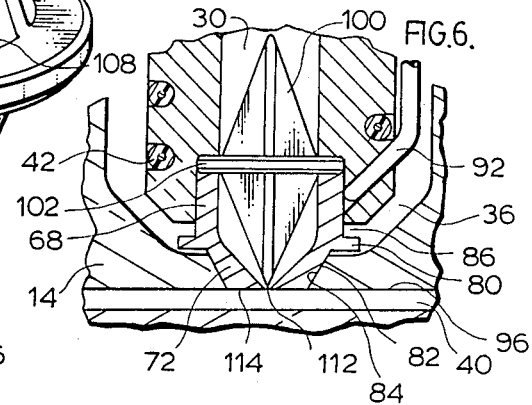
FIG. 6 is a block diagram showing a control apparatus used in the gyro compass of the invention shown in FIG. 5.

A block diagram forming FIG. 6 illustrates more concretely an example of the control apparatus 51 shown in FIG. 5.

Referring to FIG. 6, there is shown a first switch 61 that has three fixed contacts 61-1, 61-2 and 61-3 and one movable contact 61-4. The first switch 61 connects its movable contact 61-4 to one of the three fixed contacts 61-1, 61-2 and 61-3 in response to a three-mode switching signal 62A derived from a timer apparatus 62. To be more concrete, the first fixed contact 61-1 of the first switch 61 is connected to the output terminal of the follow-up pickup 8. The second fixed contact 61-2 thereof is connected to the output terminal of the accelerometer 50, and the third fixed contact 61-3 is connected to the output terminal of a fast settle computer 63 to which the output from the accelerometer 50 is supplied. Further, the movable contact 61-4 of the first switch 61 is connected to the input terminal of an amplifier 64.

The first fixed contact 61-1 of the first switch 61 corresponds to the first mode I (or azimuth shift preventing mode). In the first mode I, the moment the output 8A of the follow-up pickup 8 is supplied to the servo amplifier 23, the output 8A is supplied through the first fixed contact 61-1 and the movable contact 61-4 to the amplifier 64.

The second fixed contact 61-2 of the first switch 61 corresponds to the second mode II (levelling mode). At this time, the first switch 61 connects its movable contact 61-4 to the second fixed contact 61-2 in response to the signal indicative of the second mode II derived from the timer apparatus 62.

The third fixed contact 61-3 of the first switch 61 corresponds to the third mode III (fast settle mode). At this time, the first switch 61 responds to the signal indicating the third mode III (fast settle mode) from the timer apparatus 62 to connect its movable contact 61-4 to the third fixed contactt61-3 to which the output 50A of the accelerometer 50 is supplied via the fast settle computer 63.

The output from the movable contact 61-4 of the first switch 61 is supplied through the amplifier 64 and a second switch (on-off type switch) 65 to the vertical torquer 51 (shown in FIG. 5). The timer apparatus 62 is actuated by a switch-on signal SWA from the gyro compass or an equivalent signal thereto (produced, for example, when the power switch of the gyro is turnd ON). Further, the second switch 65 is turned on by the logic "OR" of the three first to third mode I, II and III switching signals. In other words, at the completion of these modes, the switch 65 is turned OFF to completely isolate the vertical torquer 51 (FIG. 5) from the control apparatus 52 so that the gyro compass of the invention is returned to the ordinary gyro compass.

The respective operations of the first to third modes I to III will be described.

In the first mode I (azimuth shift preventing mode), after the gyro compass is actuated, the control apparatus 52 is operated during a relatively short period of time, for example, 20 to 30 seconds. In this case, the output signal 8A from the follow-up pickup 8 is fed through the first fixed contact 61-1 and the movable contact 61-4 of the first switch 61 and the amplifier 64 back to the vertical torquer 51 so as to reduce the output 8A of the follow-up pickup 8 to zero, thus preventing the undesired movement of the follow-up ring 13 and also avoiding the random and dangerous movements of the gyro case 1 due to the swinging or the like.

In the second mode II (levelling mode), the output signal 50A from the accelerometer 50 mounted on the vertical ring 13 is supplied through the second fixed contact 61-2 and the movable contact 61-4 of the first switch 61 and the amplifier 64 to the vertical torquer 51 so that the vertical torquer 51 performs the torquing of the parts within the inclined vertical ring 3 in such a manner that the gyro spin axis is made horizontal. The gyro compass produces, if the spin axis has the initial inclination angle, an azimuth error at the error magnification of about 20 times in the process of north-seeking movement. According to the second mode II, it is possible to prevent the settling time from being extended by the initial inclination angle of the spin axis.

The third mode III is the fast settle mode, wherein the output 50A of the accelerometer 50 is supplied through the fast settle compute 63, the third fixed contact 61-3 and the movable contact 61-4 of the first switch 61 and the amplifier 64 to the vertical torquer 51. An example of the transfer function G(S) of the fast settle computer 63 is expressed by the following equation $$G(S) = \frac{\eta S}{\tau_f S + 1}$$

where $\tau_f$ is the time constant of the rolling filter in the fast settle computer 63, $\eta$ the differentiation time and S the Laplace operator, respectively.

Figure 4:
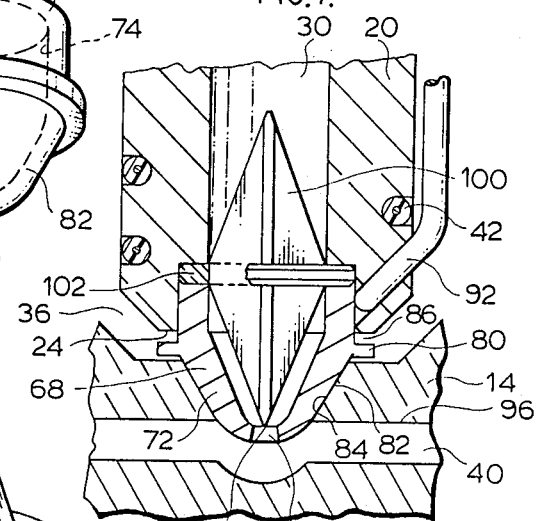
FIG. 4 is a block diagram used to explain a principle of the conventional gyro compass shown in FIG. 1.
Figure 7:
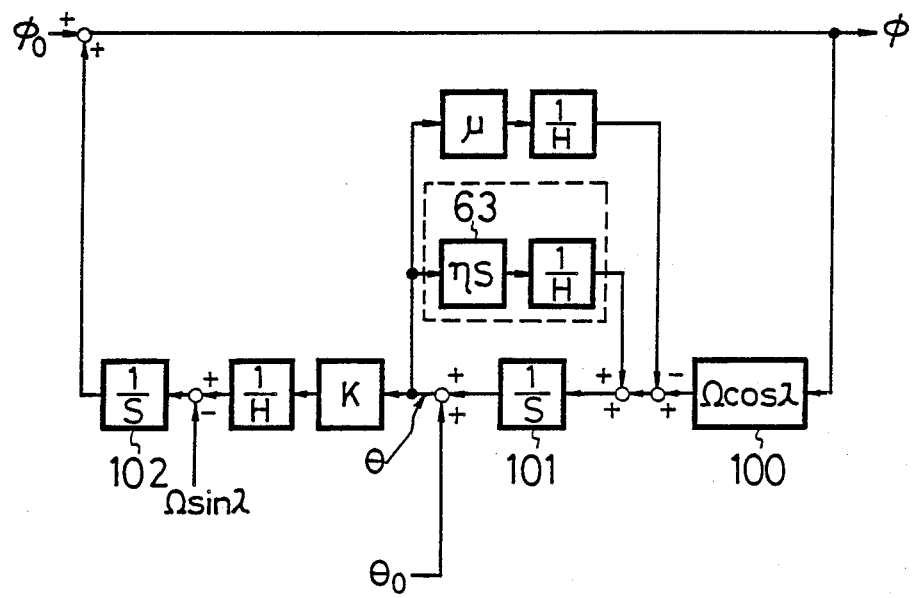
FIG. 7 is a block diagram used to explain the principle of the gyro compass of the invention shown in FIG. 5.

In the third mode III, the control apparatus 52 performs the differentiating operation fundamentally. Accordingly, a torque proportional to the time differentiation of the inclination angle of the gyro spin axis (the output 50A of the accelerometer 50) is positively fed back to the vertical torquer 51. When the gyro spin axis (e.g., the north-seeking end) is lifted up, the lifting speed is increased more and more, while when the gyro spin axis is lowered, the descending speed thereof is increased more and more, thereby to shorten (reduce) the period of the north-seeking movement. Also, the damping action thereof is increased. Thus, the settling time can be reduced considerably. A block diagram forming FIG. 7 schematically illustrates the above-mentioned third mode III. In FIG. 7, like parts corresponding to those of FIG. 4 are marked with the same references and therefore need not be described in detail. The example of FIG. 7 is different from the example of FIG. 4 only in that the block enclosed by the dashed line in FIG. 7 is added to the example of FIG. 4.

In FIG. 7, the fast settle computer 63 is represented by a differentiation element S and $\eta$ expresses a gain from the accelerometer 50 for detecting the inclination angle $\theta$ of the gyro to the vertical torquer 51.

Calculating a characteristic equation that represents the movement of the azimuth error $\phi$ in FIG. 7 yields the following equation.

$$(H-\eta)\ddot{\phi}+\mu\dot{\phi}+K\Omega \cos \lambda=0$$

Thus, adding the fast settle mode represented by $\eta$ thereto, $\eta$ acts to reduce the angular momentum H of the gyro. The above-mentioned equation yields the north-seeking movement period T of the gyro expressed as $$T = 2\pi / \sqrt{\frac{K\Omega \cos \lambda}{(H-\eta)} - \frac{1}{4}\left(\frac{\mu}{H-\eta}\right)^2}$$

Further, the half-period attenuation factor F representing the degree of attenuation is expressed as $$F = e^{-\frac{\mu}{4(\mu-\theta)}T}$$

That is, since in the third mode III the torque $\eta\dot{\theta}$ is applied to the gyro around its vertical axis, the period T can be made short and the half-period attenuation factor F can be decreased with the result that the settling time of the conventional gyro compass can be reduced considerably.

It is thus apparent from the above-mentioned equation that in order to keep the north-seeking movement stable, $$\eta < H$$

must be satisfied.

Further, since prior to the actuation of the gyro rotor there is added a slew mode in which the voltage is applied to the azimuth servo motor 19 to rotate the follow-up ring 13 to make the same coincident with a correct ship's heading, the settling time of the gyro compass can be reduced much more.

Furthermore, when the requirement for the fast settle time is relatively small, the output from the fast settle computer 63 may be directly supplied to the second switch 65 as shown by a dashed line in FIG. 6.

According to the present invention, as described above, since the first mode I (azimuth shift preventing mode) is added to the conventional gyro compass, it is possible to avoid the settling time of the gyro compass being increased when the angular momentum of the gyro is small upon actuation, the azimuth servo motor 19 is excited by the voltage from the follow-up pickup 8 to rotate the follow-up ring 13. Hence, it is possible to obtain the gyro compass of which the settling time is short. Particularly in the gyro compass of type which uses the damping weight 7 to damp or attenuate the north-seeking movement, when the vertical ring 3 is inclined upon actuation, the gyro case 1 is twisted around the vertical shafts 2, 2' by the damping weight 7 and hence, the follow-up pickup 8 produces a large output. Thus, when the gyro compass is actuated under this condition, a large azimuth shift occurs. The first mode I of the present invention is effective for preventing such a large azimuth movement from being made when the gyro compass is actuated.

According to the second mode II (levelling mode) of the present invention, it is possible to avoid the settling time of the gyro compass being increased when the gyro compass is actuated, the gyro rotor has a large inclination angle. Thus, it is possible to obtain a gyro compass of which the settling time is short.

With the third mode III (fast settle mode) of the present invention, the initial azimuth error can be damped in a short period of time and hence, it is possible to obtain a gyro compass of which the settling time is short.

If the fast settle apparatus of the present invention is applied to the conventional gyro comp[ass, the conventional gyro compass can be given the fast settle function without being influenced in efficiency and reliability thereof.

Figure 8:
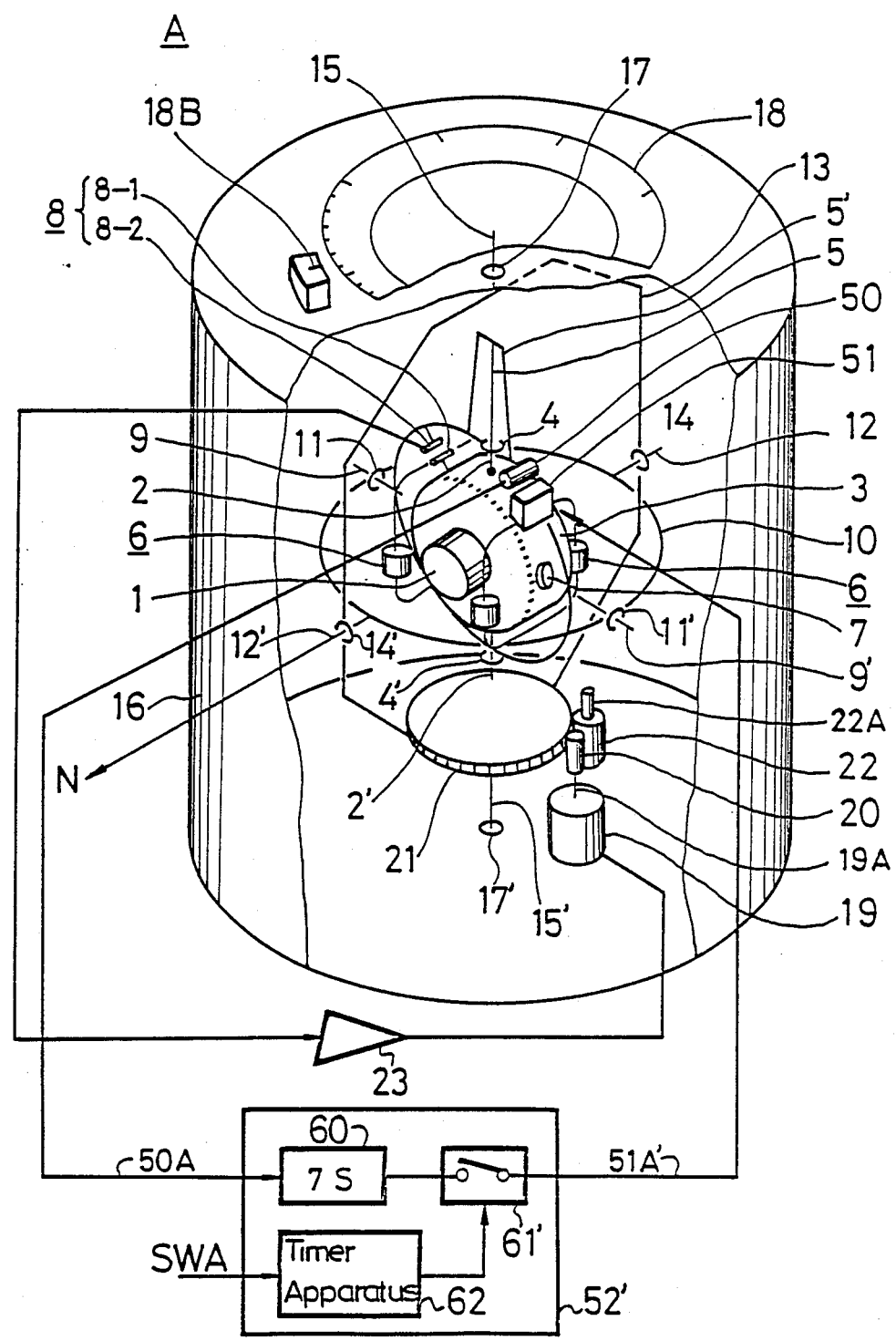
FIG. 8 is a schematic perspective view of another embodiment of a gyro compass according to the present invention.
Figure 1:
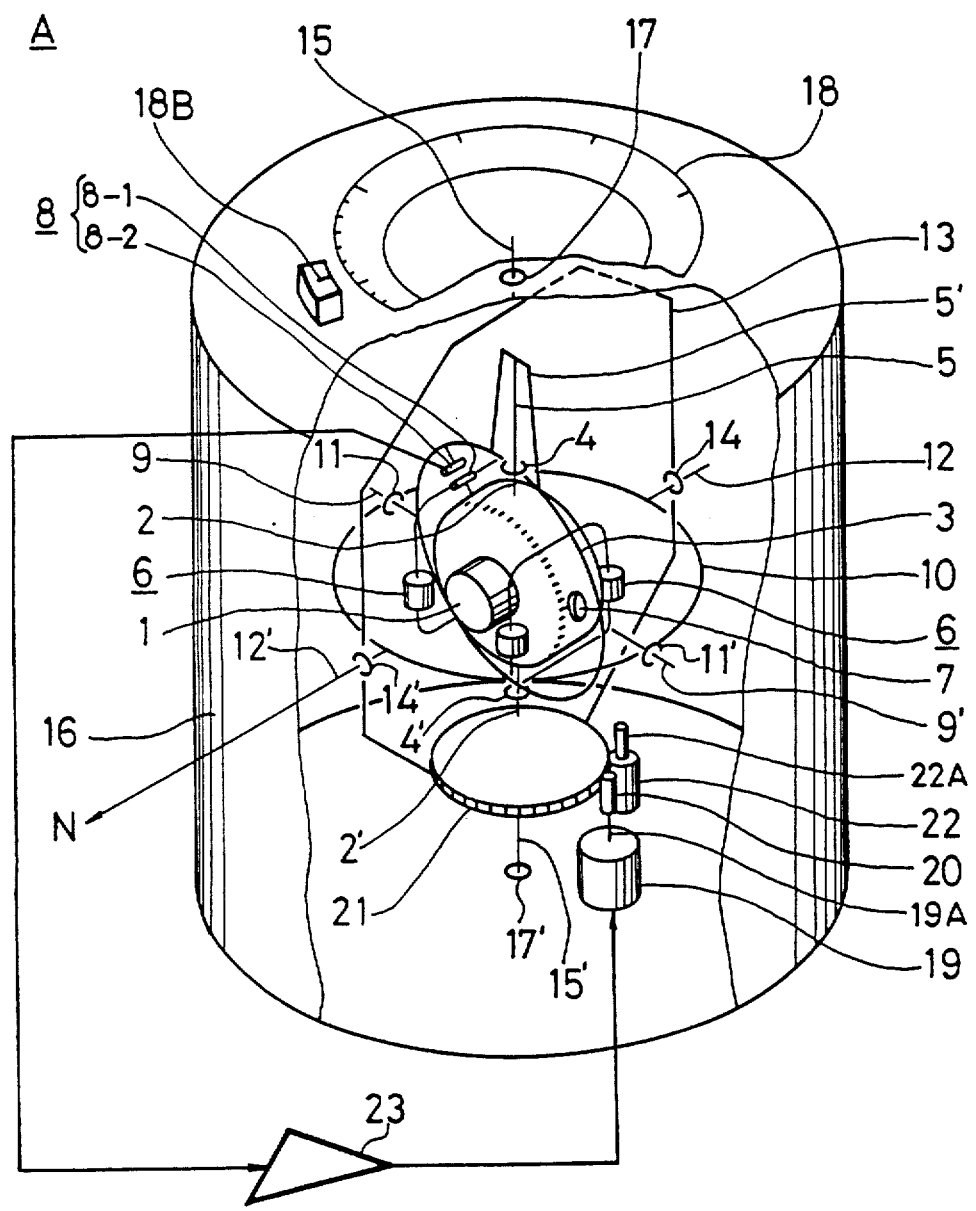
Figure 2:
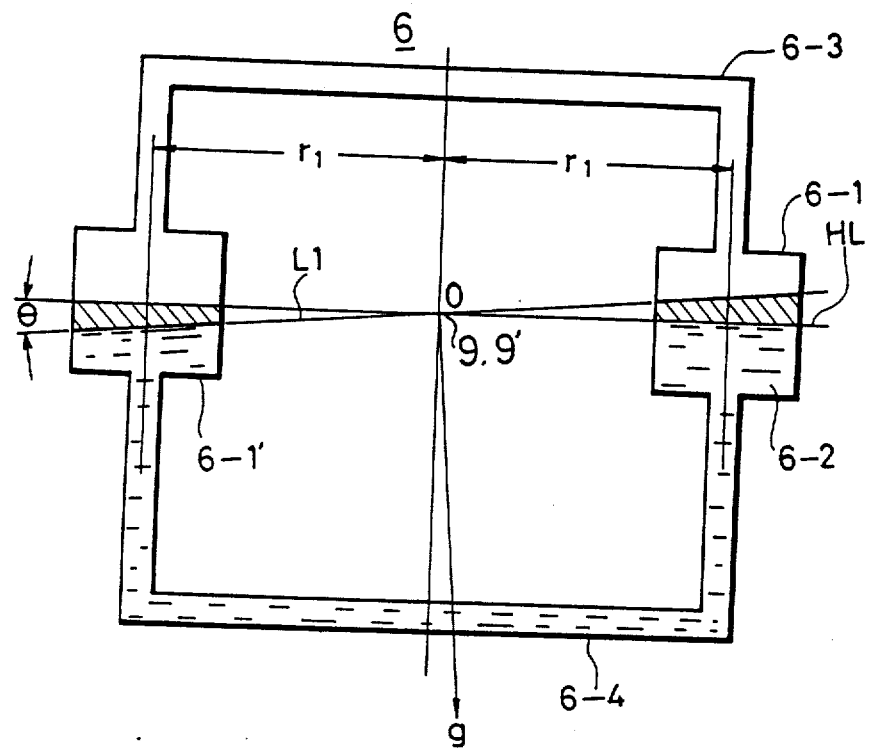
Figure 3:
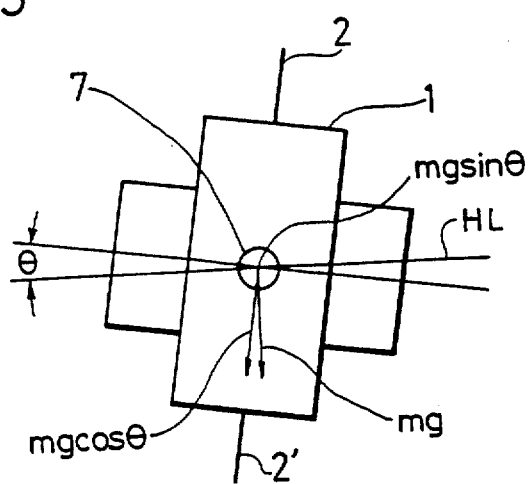
Figure 4:
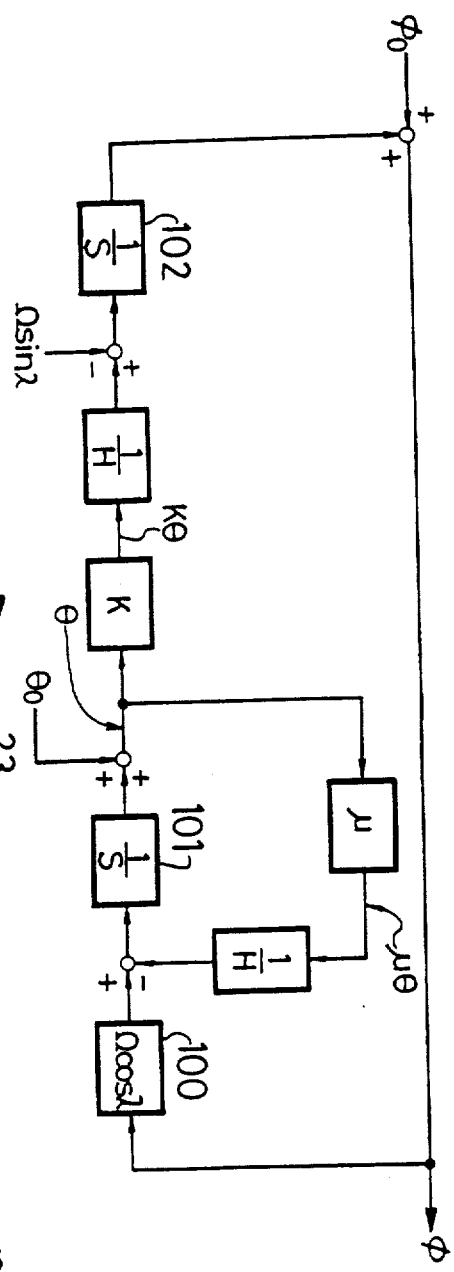
Figure 6:
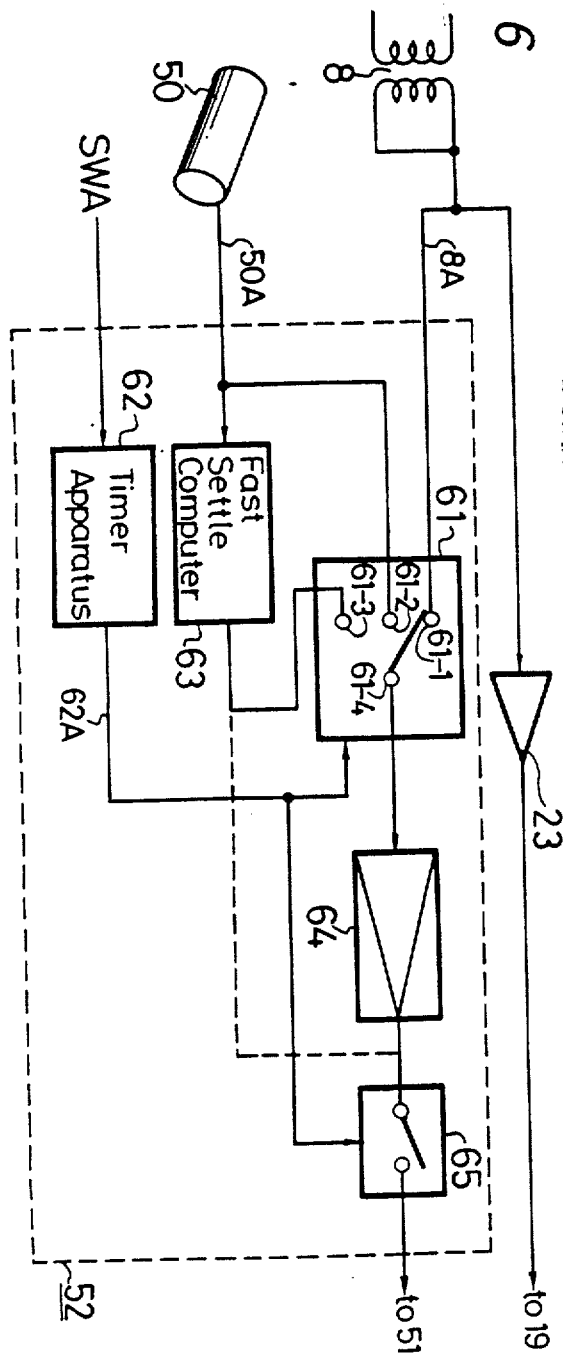
Figure 5:
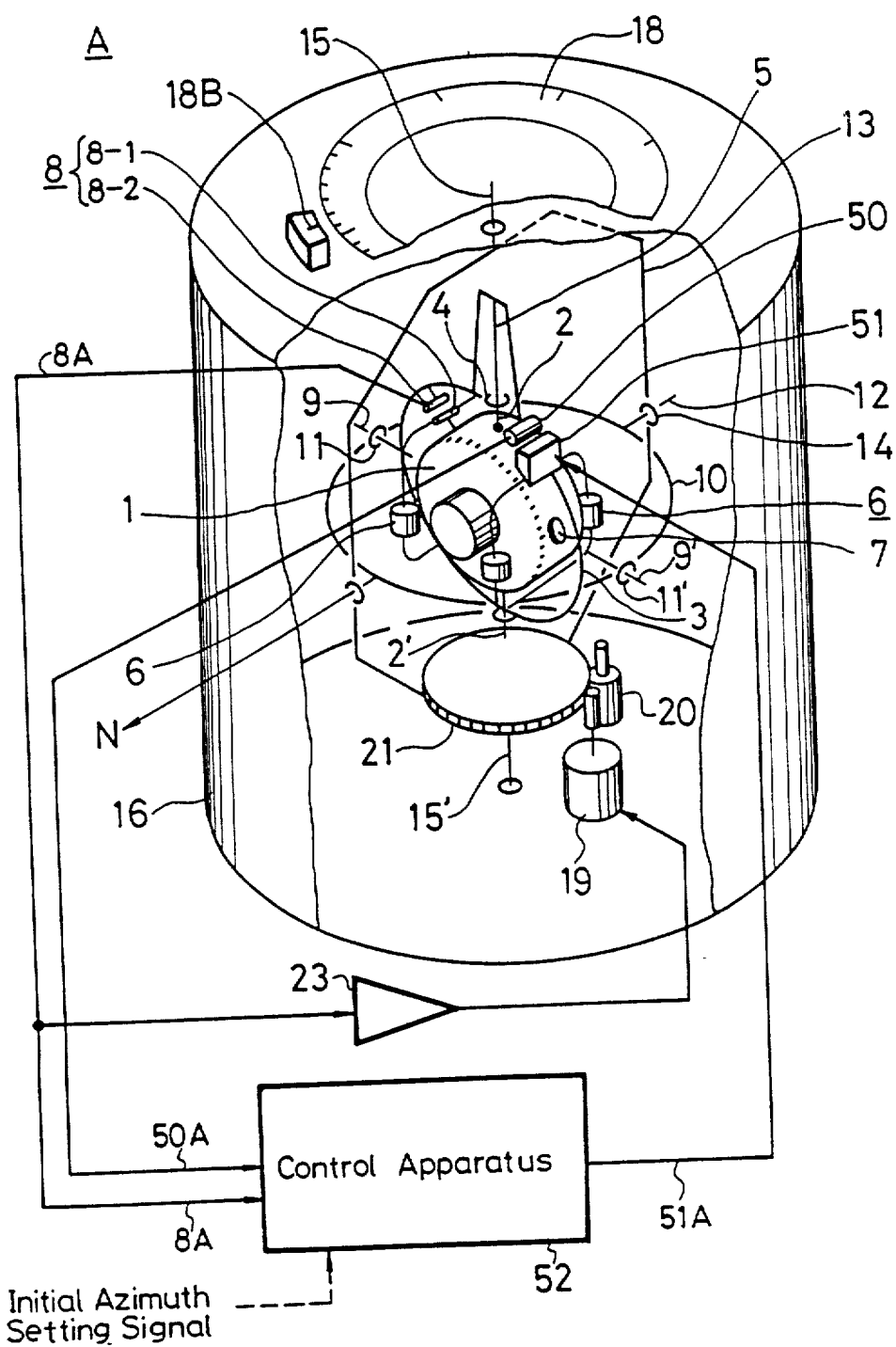

Another embodiment of the fast settle apparatus of the gyro compass according to the present invention will be described with reference to FIG. 8. In FIG. 8, like parts corresponding to those of FIG. 5 are marked with the same references and therefore will not be described in detail.

The second embodiment of FIG. 8 is different from the first embodiment shown in FIG. 5 only in that the second embodiment of the present invention shown in FIG. 8 is provided with a control apparatus 51' which receives the output signal 50A (proportional to the inclination angle of the gyro spin axis relative to the horizontal plane) of the accelerometer 50 and which supplies the output signal 51A' to the vertical torquer 51.

As FIG. 8 shows, the above control apparatus 51' includes an on-off type switch 61'. The switch 61' is turned ON and OFF in response to the mode switching signal from the timer apparatus 62 to control the delivery of the output signal 51A'. The timer apparatus 62 is actuated by the switch-on signal SWA from the gyro compass or the signal equivalent thereto, and produces a signal which turns the switch 61' OFF after a predetermined fast settle time has elapsed. The duration of period in which the timer apparatus 62 is operated is referred to as the fast settle mode (followed by the navigation mode).

In the fast settle mode, according to this embodiment, the control apparatus 52' supplies the output signal 50A of the accelerometer 50 through a control amplifier 60 to the vertical torquer 51 as the control signal 51A' similarly to the case of the mode III in the first embodiment.

While the second embodiment of the present invention is applied to the conventional gyro compass having neither accelerometer nor vertical torquer shown in FIG. 1, the present invention is not limited to the above-mentioned type of the gyro compass but can be applied to any other gyro compass having a function of, for example, accelerometer, i.e., functions by which the signal corresponding to the inclination angle of the gyro spin axis relative to the horizontal plane can be produced and the torque corresponding to the input signal is applied to the gyro around its vertical axis. In this case, by utilizing these functions and adding the control apparatus of the present invention thereto without preparing the accelerometer and the vertical torquer, it is possible to obtain the gyro compass of which the settling time can be reduced.

According to the second embodiment of the present invention, as set forth above, since the fast settle mode of the above-mentioned structure is added, it is possible to obtain the gyro compass of simplified structure and low cost of which the settling time can be reduced. Further, since the signal corresponding to the time differentiation of the gyro spin axis is applied to the gyro around its vertical axis as a torque, it is possible to achieve the short settling time by the simple computation.

Further, according to the second embodiment of the present invention as described above, as compared with a method in which the original north-seeking torque (around the horizontal axis) is increased (or reducing the north-seeking period), since the torque necessary for the fast settling may be small, a torquer of small size is sufficient. In addition, it is possible to use an amplifier of which the power consumption is very small.

It should be understood that the above description is presented by way of example on the preferred embodiments of the invention and it will be apparent that many modifications and variations thereof could be effected by on with ordinary skill in the art without departing from the spirit and scope of the novel concepts of the invention so that the scope of the invention should be determined only by the appended claims.

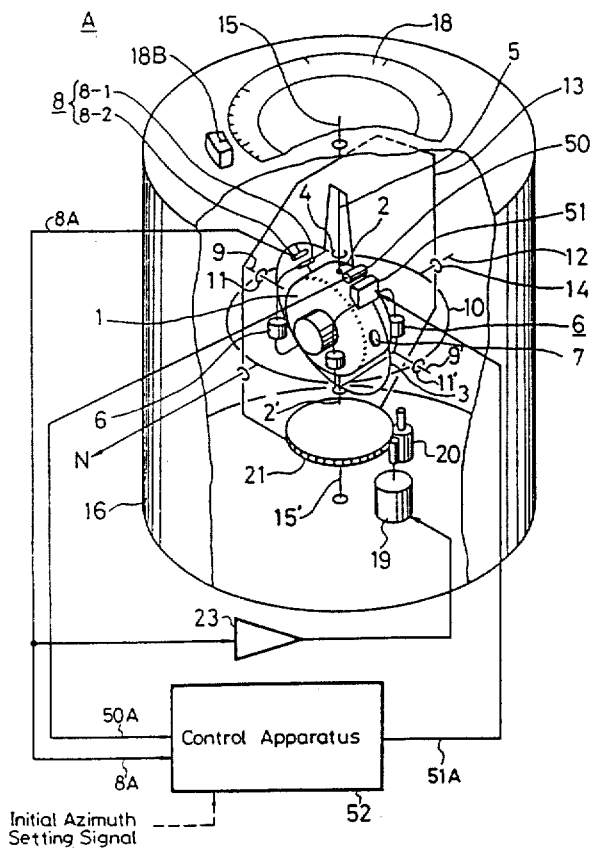

We claim as our Invention:

1. A gyro compass comprising:
   (a) a gyro case incorporating a gyro of which the spin axis is substantially horizontal;
   (b) a vertical ring disposed around the outer periphery of said gyro case and for rotatably supporting said gyro case around a vertical axis;
   (c) a follow-up pickup for detecting an angular displacement between said gyro case and said vertical ring around said vertical axis;
   (d) an accelerometer having an input axis parallel to said spin axis;
   (e) a vertical torquer mounted on said vertical ring for applying a torque of magnitude proportional to an input signal to said gyro case around said vertical axis; and
   (f) a control apparatus for receiving an output signal of said accelerometer and for supplying its output to said vertical torquer, in which during a predetermined time after the gyro compass is started to operate, the output signal from said accelerometer is differentiated to produce a differentiation signal which is then supplied to said vertical torquer to reduce a settling time of the north-seeking action.

2. A gyro compass according to claim 1, in which the output signal of said accelerometer is negatively fed back to said vertical torquer to reduce the inclination angle of said gyro to be zero.

3. A gyro compass as claimed in claim 2, in which immediately after the gyro compass is actuated, the output of said follow-up pickup is negatively fed back to said vertical torquer to prevent said vertical ring from being rotated.

4. A gyro compass as claimed in claim 1, in which said control apparatus comprises a timer which sets said predetermined time.

* * * * *

UNITED STATES PATENT AND TRADEMARK OFFICE
CERTIFICATE OF CORRECTION

PATENT NO. : 4,879,918

DATED : November 14, 1989

INVENTOR(S) : Hojo et al

It is certified that error appears in the above—identified patent and that said Letters Patent is hereby corrected as shown below:

Please delete the whole title page and substitute the attached title page. In the drawings, delete sheets 1, 2 and 3 comprising FIGS. 1, 2, 3, 4, 5 and 6 and substitute therefore the attached sheets 1, 2, 3, 4 comprising FIGS. 1-6.

Signed and Sealed this

Twenty-ninth Day of January, 1991

Attest:

HARRY F. MANBECK, JR.

Attesting Officer     Commissioner of Patents and Trademarks

United States Patent [19]

Hojo et al.

[11] Patent Number: 4,879,918
[45] Date of Patent: Nov. 14, 1989

[54] GYRO COMPASS

[75] Inventors: Takeshi Hojo; Kanshi Yamamoto; Shinichi Kawada, all of Kuroiso; Kazushige Murabayashi, Kawachi; Mamoru Akimoto, Kuroiso; Michio Fukano, Ohtawara, all of Japan

[73] Assignee: Tokyo Keiki Co., Ltd., Tokyo, Japan

[21] Appl. No.: 263,408

[22] Filed: Oct. 27, 1988

[30] Foreign Application Priority Data

Oct. 28, 1987 [JP] Japan .................. 62-272076
Oct. 28, 1987 [JP] Japan .................. 62-272077

[51] Int. Cl.⁴ .................................. G01C 19/38
[52] U.S. Cl. ........................ 74/5.47; 33/327; 74/5.9
[58] Field of Search ............. 74/5.9, 5.47; 33/327 A, 33/326

[56] References Cited

U.S. PATENT DOCUMENTS

| | | | |
|---|---|---|---|
| 3,321,841 | 5/1967 | Kawada | 33/327 |
| 3,596,366 | 8/1971 | Kawada | 33/327 |
| 3,855,711 | 12/1974 | Kawada et al. | 33/327 |
| 3,935,644 | 2/1976 | Kawada et al. | 74/5.6 D X |
| 3,938,256 | 2/1976 | Crocker | 74/5.4 X |

Primary Examiner—Rodney H. Bonck
Attorney, Agent, or Firm—Hill, Van Santen, Steadman & Simpson

[57] ABSTRACT

A gyro compass having a gyro case incorporating a gyro of which the spin axis is substantially horizontal, a vertical ring disposed around the outer periphery of the gyro case and for rotatably supporting the gyro case around a vertical axis, a follow-up pickup for detecting an angular displacement between the gyro case and the vertical ring around the vertical axis, an accelerometer having an input axis parallel to the spin axis, a vertical torquer mounted on the vertical ring for applying a torque of magnitude proportional to an input signal to the gyro case around the vertical axis, and a control apparatus for receiving an output signal of the accelerometer and for supplying its output to the vertical torquer, in which during a predetermined time after the gyro compass is started to operate, the output signal from the accelerometer is differentiated to produce a differentiation signal which is then supplied to the vertical torquer to reduce a settling time of the north-seeking action.

4 Claims, 5 Drawing Sheets